(12) United States Patent
Yu

(10) Patent No.: US 10,254,550 B2
(45) Date of Patent: Apr. 9, 2019

(54) VIRTUAL REALITY DEVICE AND ITS VIRTUAL REALITY SUPPORT DEVICE

(71) Applicant: Quanta Computer Inc., Taoyuan (TW)

(72) Inventor: Chi-Chang Yu, Taoyuan (TW)

(73) Assignee: Quanta Computer Inc., Taoyuan (TW)

(*) Notice: Subject to any disclaimer, the term of this patent is extended or adjusted under 35 U.S.C. 154(b) by 19 days.

(21) Appl. No.: 15/676,082

(22) Filed: Aug. 14, 2017

(65) Prior Publication Data

US 2018/0321497 A1 Nov. 8, 2018

(30) Foreign Application Priority Data

May 5, 2017 (TW) .............................. 106115036 A (51) Int. Cl.
*G02B 7/00* (2006.01)
*G06F 1/16* (2006.01)
*G06F 3/01* (2006.01)
*G02B 27/01* (2006.01)

(52) U.S. Cl.
CPC ......... *G02B 27/0176* (2013.01); *G02B 7/002* (2013.01); *G06F 1/163* (2013.01); *G06F 3/012* (2013.01)

(58) Field of Classification Search
CPC .... G03B 21/28; G03B 21/142; A61B 5/7445; A61B 5/0555; G01R 33/283; G02B 3/08; G02B 5/09; G02B 5/10; G02B 27/0176; G02B 7/002; G06F 1/163; G06F 3/012

USPC .................................................... 353/98, 119
See application file for complete search history.

(56) References Cited

U.S. PATENT DOCUMENTS

| | | | |
|---|---|---|---|
| 6,234,446 B1* | 5/2001 | Patterson | B64D 11/0015 224/201 |
| 2015/0150391 A1* | 6/2015 | Hsu | A47G 9/10 5/636 |
| 2016/0070110 A1* | 3/2016 | Ushakov | G08C 17/02 348/373 |
| 2016/0196694 A1* | 7/2016 | Lindeman | G02B 27/0172 345/633 |
| 2017/0370596 A1* | 12/2017 | Lee | F04D 17/16 |

FOREIGN PATENT DOCUMENTS

| | | |
|---|---|---|
| CN | 205620609 U | 10/2016 |
| CN | 205958860 U | 2/2017 |

\* cited by examiner

*Primary Examiner* — Steven Whitesell Gordon
*Assistant Examiner* — Jerry L Brooks (57) ABSTRACT

A virtual reality support device includes a hanging main body, a circuit board module and a battery module. The hanging main body has an internal space. A receiving space is defined by an outline of the hanging main body, and the receiving space allows the hanging main body to be hung onto a human body. The circuit board module is received within the internal space, and the circuit board module is provided with an electric connecting port for electrically connecting to a display device. The battery module is received within the internal space, and electrically connected to the circuit board module.

8 Claims, 5 Drawing Sheets

VIRTUAL REALITY DEVICE AND ITS VIRTUAL REALITY SUPPORT DEVICE

RELATED APPLICATIONS

This application claims priority to Taiwan Application Serial Number 106115036, filed May 5, 2017, which is herein incorporated by reference.

BACKGROUND

Field of Disclosure

The present disclosure relates to an electronic device. More particularly, the present disclosure relates to a virtual reality device.

Description of Related Art

With the advancement of technology, in order to provide a user with viewing virtual reality images, a head-mounted virtual reality (VR) display for showing virtual reality images is launched in related markets, so as to provide user with a three-dimensional virtual world simulated by a computer, and synchronously provide the user with the virtual reality images corresponding to the user's view angle, thereby enhancing the user's viewing experience.

However, in a conventional virtual reality technology, for using a computer to simulate and provide corresponding virtual reality images in a virtual world to a conventional head-mounted VR display which is worn on a user, the conventional head-mounted VR display has to maintain connection to a desktop computer or another fixed computer host by a transmission cable. Consequently, not only a moving range of the user is limited, but also the user's use intention is reduced.

Hence, how to develop a solution for effectively overcoming the aforementioned inconvenience and disadvantages is an urgent and importance topic for this industry.

SUMMARY

One embodiment of the disclosure provides a virtual reality support device. The virtual reality support device includes a hanging main body, a circuit board module and a battery module. The hanging main body has an internal space therein. A receiving space is defined by an outline of the hanging main body, and the receiving space allows the hanging main body to be hung onto a human body. The circuit board module is received within the internal space, and is configured to process virtual images. The circuit board module is provided with an electric connecting port for electrically connecting to a display device. The battery module is received within the internal space, and electrically connected to the circuit board module. In one example, after a human neck is located within the receiving space, the hanging main body is attached onto the human neck.

In one or more embodiments of the disclosure, the hanging main body includes a first hollow section, a second hollow section and a third hollow section. The second hollow section is connected to the first hollow section and the third hollow section, and a gap communicating with the receiving space is formed between the first hollow section and the third hollow section. The second hollow section is flexible, and a hardness of the second hollow section is smaller than a hardness of the first hollow section and a hardness of the third hollow section.

In one or more embodiments of the disclosure, the hanging main body includes a first venting hole portion and a second venting hole portion. The first venting hole portion is formed on a position of the second hollow section opposite to the receiving space, and communicates with the internal space. The second venting hole portion is formed on one end of the first hollow section opposite to the second hollow section, and communicates with the internal space. The circuit board module is arranged between the first venting hole portion and the second venting hole portion.

In one or more embodiments of the disclosure, the virtual reality support device further includes at least one fan module disposed between the first venting hole portion and the second venting hole portion, and electrically connected to the circuit board module.

In one or more embodiments of the disclosure, the circuit board module is disposed in the first hollow section. The battery module is disposed in the third hollow section. The hanging main body is further provided with a counterweight component installed on one of the first hollow section and the third hollow section, such that a loading weight of the first hollow section and a loading weight of the third hollow section are the same.

In one or more embodiments of the disclosure, the virtual reality support device further includes a first audio output component and a second audio output component. The first audio output component is received within the first hollow section, and is electrically connected to the circuit board module. The second audio output component is received within the third hollow section, and is electrically connected to the circuit board module.

In one or more embodiments of the disclosure, the hanging main body includes a first hollow section and a second hollow section. One end of the first hollow section is connected to one end of the second hollow section, and a gap communicated with the receiving space is formed between the other end of the first hollow section and the other end of the second hollow section. A hardness of the second hollow section is less than a hardness of the first hollow section.

In one or more embodiments of the disclosure, the outline of the hanging main body is in a U-shape, an inverted-U-shape or an O-shape.

Another embodiment of the disclosure provides a virtual reality device. The virtual reality device includes the aforementioned virtual reality support device and a display device. The display device includes a wearable device and a display host device. The wearable device is worn on a human head. The display host device is connected to the wearable device, and is electrically connected to the circuit board module.

In one or more embodiments of the disclosure, the circuit board module is provided with a first electric connecting port, the display host device is provided with a second electric connecting port, and the first electric connecting port and the second electric connecting port are electrically connected to each other through a transmission cable.

Therefore, by the aforementioned virtual reality support device and virtual reality device, a user wearing the aforementioned virtual reality device can move freely, such that the moving range of the user will not be limited so as to further increase the user's use intention.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Figure 1:
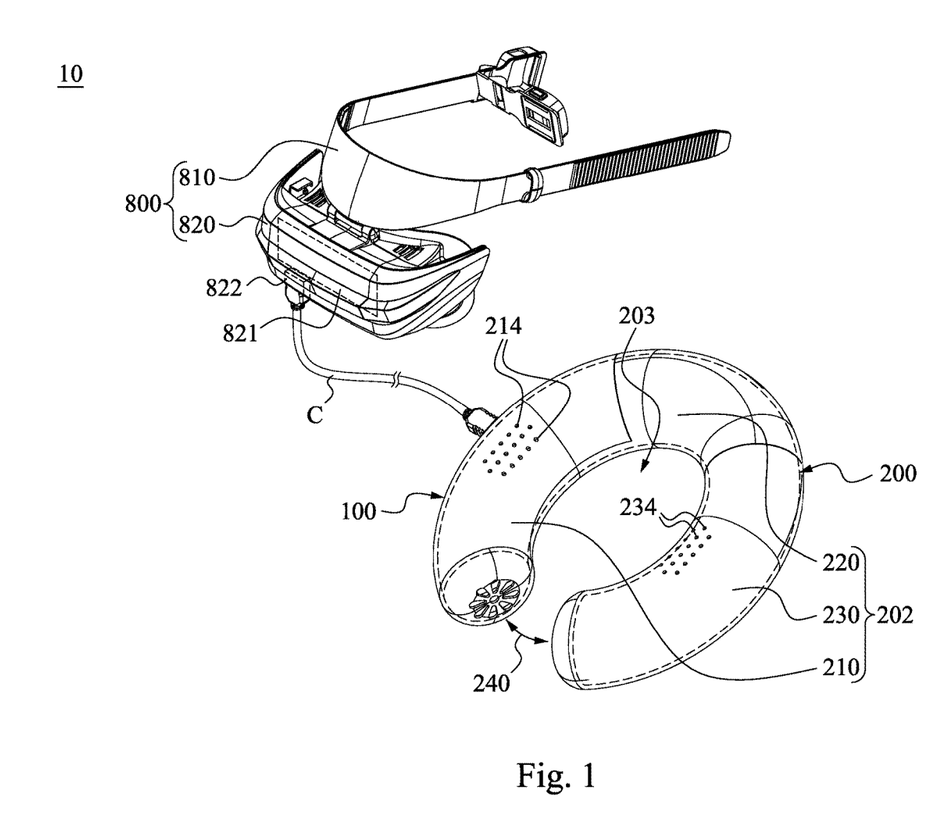
FIG. 1 is an exploded view of a virtual reality device according to one embodiment of the disclosure.
Figure 2:
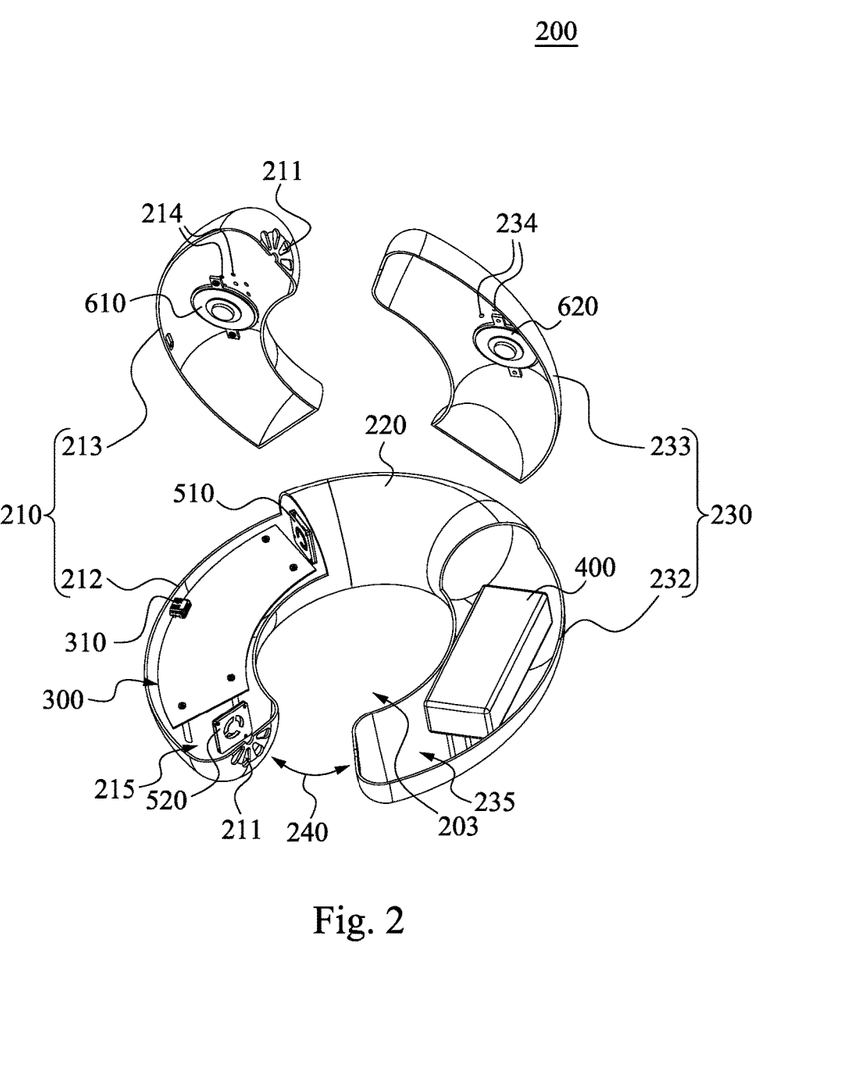
FIG. 2 is a partial exploded view of a virtual reality support device of FIG. 1.

Reference is now made to FIG. 1 and FIG. 2 in which FIG. 1 is an exploded view of a virtual reality device 10 according to one embodiment of the disclosure, and FIG. 2 is a partial exploded view of the virtual reality support device 100 of FIG. 1. As shown in FIG. 1 and FIG. 2, in the embodiment, the virtual reality device 10 includes a virtual reality support device 100 and a display device 800. The display device 800 includes a wearable device 810 and a display host device 820. The display host device 820 is connected to the wearable device 810. The virtual reality support device 100 includes a hanging main body 200, a circuit board module 300 and a battery module 400. The hanging main body 200 has an internal space 202 therein. A receiving space 203 is concavely defined by an outline of the hanging main body 200. The circuit board module 300 is received within the internal space 202 for processing virtual images. For example, the circuit board module 300 at least includes a circuit board, a memory unit, a storage unit, a central processing unit and graphic processing unit (not shown in figures). The memory unit, the storage unit, the central processing unit and the graphic processing unit are electrically connected to the circuit board, and are respectively electrically connected to the battery module 400 through the circuit board. The circuit board module 300 is electrically connected to the display host device 820 through the transmission cable C. For example, the circuit board module 300 is provided with an electric connecting port 310. The first electric connecting port 310 is mounted on the circuit board, and is electrically connected to the battery module 400 through the circuit board. The display host device 820 is provided with a second electric connecting port 822. The first electric connecting port 310 and the second electric connecting port 822 are electrically connected to each other through the transmission cable C. For example but not limited thereto, the transmission cable C is a HDMI cable or a USB cable. In another specific embodiment, the circuit board module 300 is wirelessly electrically connected to the display host 820 with a wireless protocol such as Bluetooth, Wi-Fi and so on, and the transmission cable C is not required. In another specific embodiment, the conductor of the wire transmission cable C is able to transfer corresponding information signals or power signals, or both of the information signals and power signals.

The battery module 400 is received within the internal space 202, and is electrically connected to the circuit board module 300. For example, the battery module 400 is electrically connected to the circuit board module 300 through wires (not shown in Figurers). Specifically, referring to FIG. 1, in this embodiment, the outline of the hanging main body 200 is in a U-shape. However, in another embodiment, the outline of the hanging main body 200 also can be in an inverted-U shape or an O-shape. It is noted that, when the outline of the hanging main body 200 is in an O-shape, the hanging main body 200 has a flexible (i.e., deformable) property, such that a user's head can be directly inserted through the hanging main body 200, and alternatively, the hanging main body is dismantlable.

In this embodiment, the hanging main body 200 includes a first hollow section 210, a second hollow section 220 and a third hollow section 230. Two opposite ends of the second hollow section 220 are connected to one end of the first hollow section 210 and one end of the third hollow section 230 respectively, and a gap 240 communicating with the receiving space 203 is formed between the other end of the first hollow section 210 and the other end of the third hollow section 230. In a specific embodiment, the circuit board module 300 is disposed in the first hollow section 210. The battery module 400 is disposed in the third hollow section 230. In an embodiment, the second hollow section 220 is flexible, and a hardness of the second hollow section 220 is smaller than a hardness of the first hollow section 210 and a hardness of the third hollow section 230. For example but not limited thereto, the material of the second hollow section 220 may be a flexible material such as rubber, silicone, foam and so on. The materials of the first hollow section 210 and the third hollow section 230 may be materials with greater hardness such as plastic or metal. Also, for example but not limited thereto, the first hollow section 210, the second hollow section 220 and the third hollow section 230 are integrally formed, for example, by using a dual-material injection molding method, but the disclosure is not limited thereto. In another embodiment, the second hollow section 220 is coupled to the first hollow section 210 and the third hollow section 230 by using adhesives or tightening screws.

Figure 3:
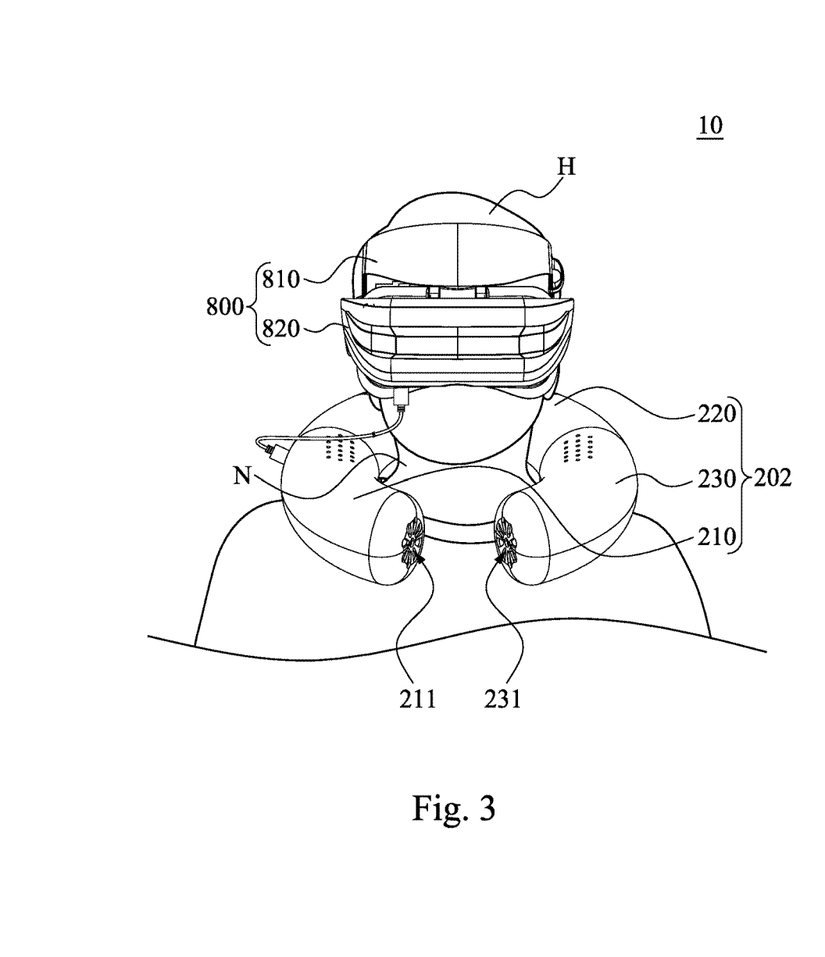
FIG. 3 is an operational schematic view of the virtual reality device of FIG. 1.

FIG. 3 is an operational schematic view of the virtual reality device 10 of FIG. 1. Refer to FIG. 3, since the second hollow section 220 is flexible, when a user pulls the first hollow section 210 away from the third hollow section 230 by hands for enlarging the gap 240, the second hollow section 220 is squeezed to be deformed so as to allow a human neck N of the user to enter the receiving space 203 via the gap 240, such that the hanging main body 200 can be attached on the human neck N as a neck hanger type apparatus, thus enabling the virtual reality support device 100 of the virtual reality device 10 to be carried onto a human neck N (or shoulders). Therefore, because of the aforementioned virtual reality support device 100 and virtual reality device 10, the user can move freely with wearing the aforementioned virtual reality support device 100 and display device 800, such that the moving range of the user will not be limited, so as to further increase the user's use intention. Hence, after the aforementioned virtual reality support device 100 is hung onto the human neck N (or shoulders), the wearable device 810 is worn on the human head H of the user. After the display host 820 covers the human eyes (not shown), the display host 820 can provide virtual images to the human eyes.

However, it is noted that the hanging main body 200 of the aforementioned virtual reality support device 100 being attached on the human neck N (or shoulders) is merely one of the user options. In another embodiment, as long as a user can move freely with wearing the hanging main body 200 of the aforementioned virtual reality support device 100, the hanging main body of the aforementioned virtual reality support device also can be optionally attached on a waist, arm or head of the user in accordance with different sizes and characteristics of the hanging main body.

Figure 4:
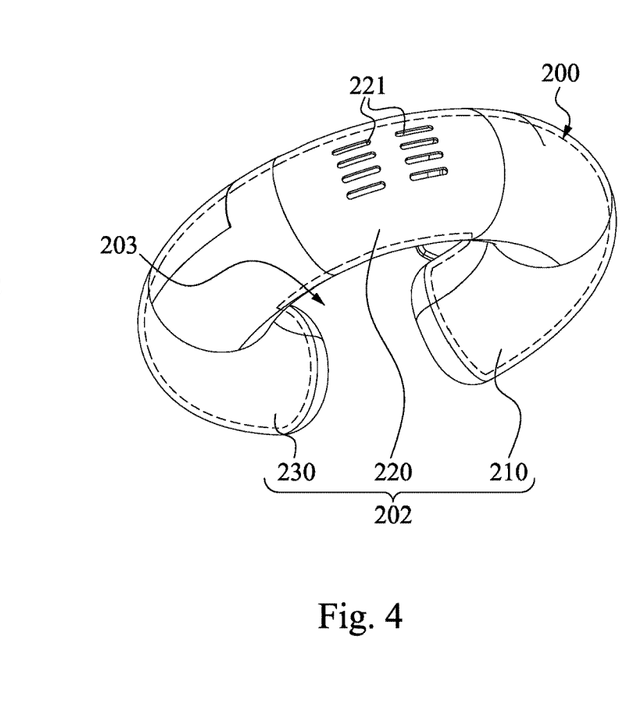
FIG. 4 is a rear view of the virtual reality support device of FIG. 1.

FIG. 4 is a rear view of the virtual reality support device 100 of FIG. 1. As shown in FIG. 4, the hanging main body 200 further includes a first venting hole portion 221 and a second venting hole portion 211. The first venting hole portion 221 is formed on the second hollow section 220 opposite to the receiving space 203, and communicates with the internal space 202, and in certain examples, the first venting hole portion 221 is directly formed on the second hollow section 220. The second venting hole portion 211 is formed on one end of the first hollow section 210 opposite to the second hollow section 220, that is, the second venting hole portion 211 is formed on one end of the first hollow section 210 facing towards the gap 240. The second venting hole portion 211 communicates with the internal space 202, and in certain examples, the second venting hole portion 211 is directly formed on the first hollow section 210. Referring to FIG. 2 and FIG. 4, since the circuit board module 300 is arranged between the first venting hole portion 221 and the second venting hole portion 211, heat generated by the circuit board module 300 can be dissipated through the first venting hole portion 221 and the second venting hole portion 211. Furthermore, as shown in FIG. 3, the hanging main body 200 further includes a third venting hole portion 231. The third venting hole portion 231 is formed on one end of the third hollow section 230 opposite to the second hollow section 220, that is, the third venting hole portion 231 is formed on one end of the third hollow section 230 facing towards the gap 240 for enhancing heat-dissipation performance.

Furthermore, as shown in FIG. 2, the virtual reality support device 100 further includes at least one first fan module 510 and at least one second fan module 520. The first fan module 510 is installed in the first hollow section 210 between the first venting hole portion 221 and the circuit board module 300, and is electrically connected to the circuit board module 300; alternatively, the first fan module can be installed between the first hollow section 210 and the second hollow section 220. The second fan module 520 is installed in the first hollow section 210 between the second venting hole portion 211 and the circuit board module 300, and is electrically connected to the circuit board module 300. Therefore, when the first fan module 510 and the second fan module 520 are activated, a heat-dissipation route sequentially passing through the second venting hole portion 211, the second fan module 520, the circuit board module 300, the first fan module 510 and the first venting hole portion 221 is formed, so as to not only increase the heat-dissipation efficiency, but also reduce the possibilities that the user feels heat or odors.

In the embodiment, as shown in FIG. 2, the first hollow section 210 includes a first bottom case 212 and a first upper cover 213. The first bottom case 212 is connected to the second hollow section 220, and is concavely formed with a first recess 215. The circuit board module 300, the first fan module 510 and the second fan module 520 are disposed in the first recess 215. The first upper cover 213 completely covers the first recess 215 for covering the circuit board module 300, the first fan module 510 and the second fan module 520. The third hollow section 230 includes a second bottom case 232 and a second upper cover 233. The second bottom case 232 is connected to the second hollow section 220, and is concavely formed with a second recess 235. The battery module 400 is disposed in the second recess 235. The second upper cover 233 completely covers the second recess 235 for covering the battery module 400. In one specific embodiment, when the first bottom case 212 and the first upper cover 213 are assembled together, the entire second venting hole portion 211 can be formed, that is, one part of the second venting hole portion 211 is formed on the first bottom case 212, and the other part of the second venting hole portion 211 is formed the first upper cover 213 (FIG. 3). In another specific embodiment, the second venting hole portion 211 can be solely formed on either the first bottom case 212 or the first upper cover 213.

Similarly, the third venting hole portion 231 also can be formed with the same design, that is, two parts of the third venting hole portion 231 are respectively formed on the second bottom case 232 and the second upper cover 233; or the third venting hole portion 231 is solely formed on either the second bottom case 232 or the second upper cover 233.

The virtual reality support device 100 further includes a first audio output component 610 (e.g., a microphone member) and a second audio output component 620 (e.g., a microphone member). The first audio output component 610 is received within the first hollow section 210, and is electrically connected to the circuit board module 300. For example but not limited thereto, the first audio output component 610 is disposed on an inner wall of the first upper cover 213, and faces towards sound holes 214 (FIG. 1) of the first upper cover 213. The second audio output component 620 is received within the third hollow section 230, and is electrically connected to the circuit board module 300. For example but not limited thereto, the second audio output component 620 is disposed on an inner wall of the second upper cover 233, and faces towards sound holes 234 (FIG. 1) of the second upper cover 233. In the embodiment, the wearable device 810 of the display device 800, for example but not limited thereto, also can be formed in an elastic belt type, a helmet type, a Velcro® type or a hoop type and another conventional type. The display host 820 is used to cover the human eyes, and provide virtual images to the user's human eyes. The display host 820 is provided with a display screen 821 and a lens (not shown in figures) arranged between the display screen 821 and the human eyes of the user for supporting augmented reality (AR). The lens, for example, is a see-through waveguide lens or a projection lens. Since the display device 800 in virtual reality (VR) technology is well-known, the specified details of the display device in the disclosure are not described herein.

Figure 5:
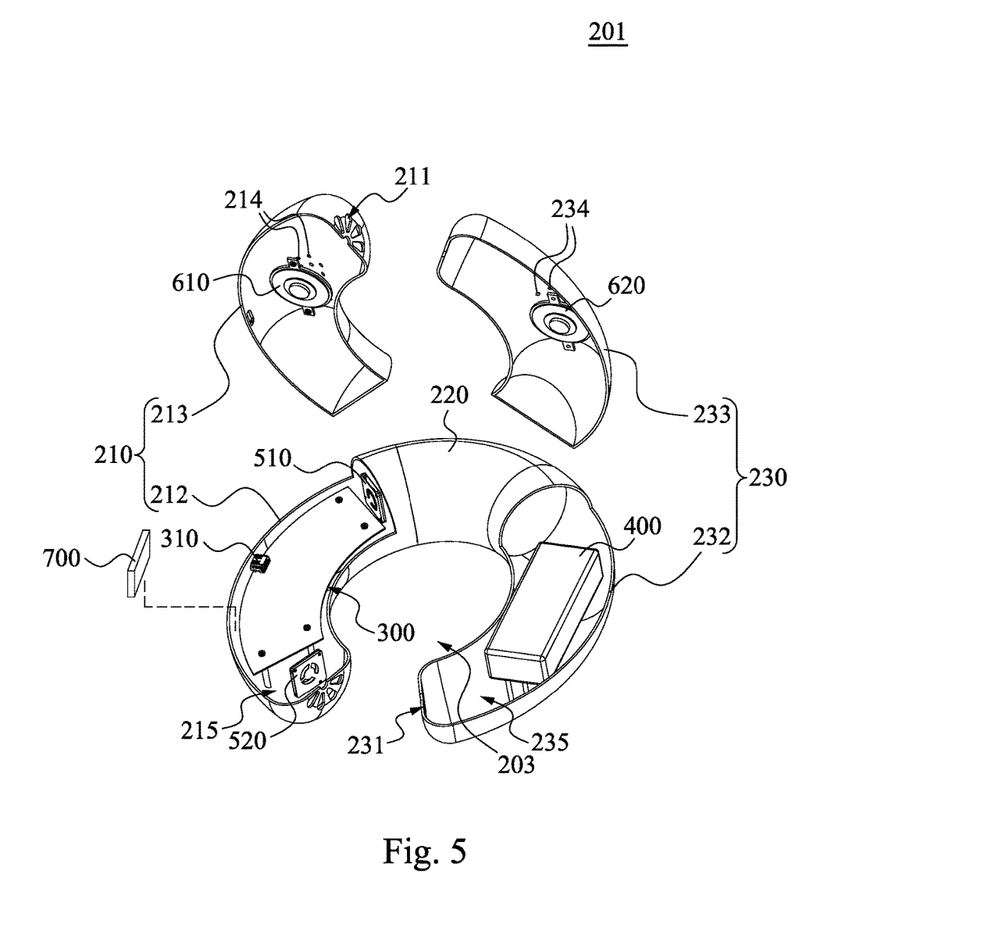
FIG. 5 is a partial exploded view of a virtual reality support device according to one embodiment of the disclosure.

FIG. 5 is a partial exploded view of a virtual reality support device according to one embodiment of the disclosure. As shown in FIG. 5, the virtual reality support device in FIG. 5 is substantially the same as the virtual reality support device 100 in FIG. 1 in which the same elements are given the same numerical references in FIG. 5. However, at least one difference between the hanging main body 201 in FIG. 5 and the hanging main body 200 in FIG. 2 is that, the hanging main body 201 on the embodiment is further provided with a counterweight component 700. Thus, if the weight of the battery module 400 is greater than the weight of the circuit board module 300, the counterweight component 700 is disposed in the first hollow section 210 so as to make the loading weight of the first hollow section 210 and the same as the loading weight of the third hollow section 230, thereby reducing the possibilities of dropping the virtual reality support device towards the third hollow section 230 due to uneven weights. However, the disclosure is not limited thereto. Reversely, if the weight of the circuit board module 300 is greater than the weight of the battery module 400, the counterweight component 700 is disposed in the third hollow section 230 so as to balance the loading weight of the first hollow section 210 with the loading weight of the third hollow section 230. The counterweight component 700, for example, is a metal block and the like.

Figure 6:
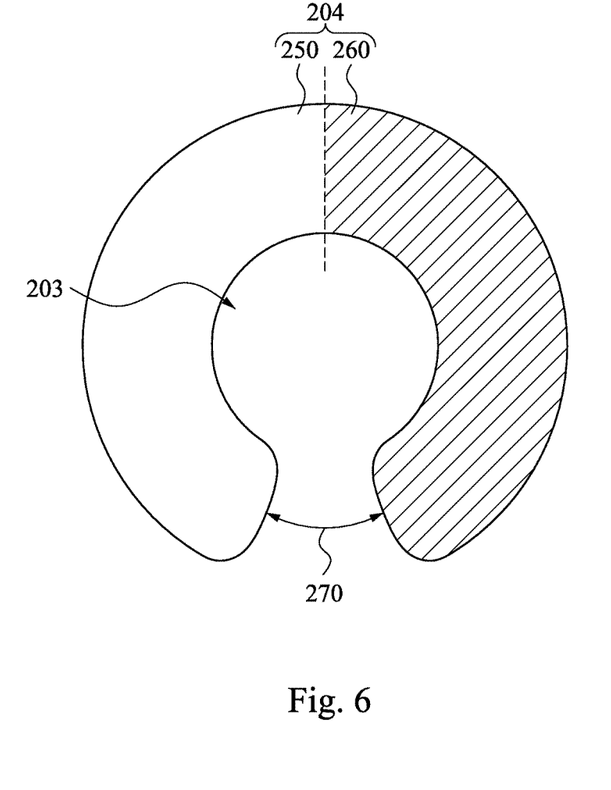
FIG. 6 is a schematic view of a virtual reality support device according to one embodiment of the disclosure.

FIG. 6 is a schematic view of a virtual reality support device 100 according to one embodiment of the disclosure. As shown in FIG. 6, the virtual reality support device in FIG. 6 is substantially the same to the virtual reality support device 100 in FIG. 1 in which the same elements are given the same numerical references in FIG. 6. However, at least one difference between the hanging main body 204 in FIG. 6 and the hanging main body 200 in FIG. 1 is that, the hanging main body 204 is only provided with a fourth hollow section 250 and a fifth hollow section 260 one end of which is connected to one end of the fourth hollow section 250, and a gap 270 communicating with the receiving space 203 is formed between the other end of the fourth hollow section 250 and the other end of the fifth hollow section 260. In a specific embodiment, the fifth hollow section 260 is flexible, and a hardness of the fourth hollow section 250 is greater than a hardness of the fifth hollow section 260. For example but not limited thereto, the material of the fifth hollow section 260 may be a flexible material such as rubber, silicone, foam and so on. The materials of the fourth hollow section 250 may be materials with greater hardness such as plastic or metal.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A virtual reality support device, comprising:
 a hanging main body formed in a U- shape, and having an internal space therein, wherein a receiving space is defined by an outline of the hanging main body, a gap is formed between two ends of the outline of the hanging main body to communicate with the receiving space, and the receiving space allows the hanging main body to be hung onto a human body, and the hanging main body comprises a first venting hole portion and a second venting hole portion, the first venting hole portion is formed on the hanging main body opposite to the receiving space and communicates with the internal space, and the second venting hole portion is formed on one of the two ends of the outline of the hanging main body and communicates with the internal space;
 a circuit board module received within the internal space and arranged between the first venting hole portion and the second venting hole portion, wherein the circuit board module is provided with an electric connecting port for electrically connecting to a display device;
 at least one first fan module received within the internal space, arranged between the first venting hole portion and the circuit board module, electrically connected to the circuit board module, and configured to draw air from the second venting hole portion to the first venting hole portion;
 at least one second fan module received within the internal space, arranged between the second venting hole portion and the circuit board module, electrically connected to the circuit board module, and configured to draw air from the second venting hole portion to the first venting hole portion, wherein when the first fan module and the second fan module are activated, a heat-dissipation route which sequentially passes through the second venting hole portion, the second fan module, the circuit board module, the first fan module and the first venting hole portion is formed; and
 a battery module received within the internal space, and electrically connected to the circuit board module.

2. The virtual reality support device of claim 1, wherein the hanging main body comprises a first hollow section, a second hollow section and a third hollow section, wherein the second hollow section is connected to the first hollow section and the third hollow section, and the gap is formed between the first hollow section and the third hollow section, wherein the second hollow section is flexible, and a hardness of the second hollow section is smaller than a hardness of the first hollow section and a hardness of the third hollow section.

3. The virtual reality support device of claim 2, wherein the first venting hole portion is formed on the second hollow section opposite to the receiving space and communicates with the internal space, the second venting hole portion is formed on one end of the first hollow section opposite to the second hollow section and communicates with the internal space.

4. The virtual reality support device of claim 2, wherein the circuit board module is disposed in the first hollow section, the battery module is disposed in the third hollow section, the hanging main body is further provided with a counterweight component installed on one of the first hollow section and the third hollow section.

5. The virtual reality support device of claim 2, further comprises:
 a first audio output component received within the first hollow section, and electrically connected to the circuit board module; and
 a second audio output component received within the third hollow section, and electrically connected to the circuit board module.

6. The virtual reality support device of claim 1, wherein the hanging main body comprises a first hollow section and a second hollow section, wherein one end of the first hollow section is connected to one end of the second hollow section, and the gap is formed between the other end of the first hollow section and the other end of the second hollow section, and a hardness of the second hollow section is smaller than a hardness of the first hollow section.

7. A virtual reality device, comprising:
 a virtual reality support device, comprising:
  a hanging main body formed in a U- shape, and having an internal space therein, wherein a receiving space is defined by an outline of the hanging main body, a gap is formed between two ends of the outline of the hanging main body to communicate with the receiving space, and the receiving space allows the hanging main body to be hung onto a human body, and the hanging main body comprises a first venting hole portion and a second venting hole portion, the first venting hole portion is formed on the hanging main body opposite to the receiving space and communicates with the internal space, and the second venting hole portion is formed on one of the two ends of the outline of the hanging main body and communicates with the internal space;

a circuit board module received within the internal space and arranged between the first venting hole portion and the second venting hole portion, and configured to process virtual images;

at least one first fan module received within the internal space, arranged between the first venting hole portion and the circuit board module, electrically connected to the circuit board module, and configured to draw air from the second venting hole portion to the first venting hole portion;

at least one second fan module received within the internal space, arranged between the second venting hole portion and the circuit board module, electrically connected to the circuit board module, and configured to draw air from the second venting hole portion to the first venting hole portion, wherein when the first fan module and the second fan module are activated, a heat-dissipation route which sequentially passes through the second venting hole portion, the second fan module, the circuit board module, the first fan module and the first venting hole portion is formed; and a battery module received within the internal space, and electrically connected to the circuit board module; and a display device, comprising:
a wearable device for being worn on a human head; and
a display host device connected to the wearable device, and electrically connected to the circuit board module.

8. The virtual reality device of claim 7, wherein the circuit board module is provided with a first electric connecting port, the display host device is provided with a second electric connecting port, and the first electric connecting port and the second electric connecting port are electrically connected to each other through a transmission cable.

* * * * *